(12) United States Patent
Daly

(10) Patent No.: US 6,588,534 B1
(45) Date of Patent: Jul. 8, 2003

(54) TRANSVERSE ENGINE MOUNTING ARRANGEMENT

(75) Inventor: Mark Allen Daly, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/560,357

(22) Filed: Apr. 28, 2000

(51) Int. Cl.[7] .............................................. B60K 13/00
(52) U.S. Cl. ...................................... 180/300; 180/297
(58) Field of Search ................................ 180/300, 291, 180/312, 297; 267/140.11, 274; 280/679, 124.13, 124.107, 124.104, 124.106, 124.108, 124.109, 124.152, 124.166, 124.128, 785

(56) References Cited

U.S. PATENT DOCUMENTS

| | | | |
|---|---|---|---|
| 4,153,272 A | * | 5/1979 | Fiedler et al. ............... 280/689 |
| 4,240,517 A | * | 12/1980 | Harlow, Jr. et al. .......... 180/295 |
| 4,377,218 A | * | 3/1983 | Fukushima ................. 180/300 |
| 4,381,043 A | * | 4/1983 | Fukushima ................. 180/300 |
| 4,440,257 A | * | 4/1984 | Danckert .................... 180/300 |
| 5,133,427 A | * | 7/1992 | Arvidsson et al. .......... 180/297 |
| 5,178,406 A | * | 1/1993 | Reynolds .................... 280/723 |
| 6,022,030 A | * | 2/2000 | Fehring .................... 280/5.511 |
| 6,065,559 A | * | 5/2000 | Cholewczynski et al. ... 180/297 |
| 6,089,583 A | * | 7/2000 | Taipale .................. 280/124.13 |
| 6,099,004 A | * | 8/2000 | Lin ..................... 280/124.107 |
| 6,206,392 B1 | * | 3/2001 | Siecinski et al. ..... 280/124.166 |

* cited by examiner

Primary Examiner—Lesley D. Morris
Assistant Examiner—Tony Winner
(74) Attorney, Agent, or Firm—Ford Global Technologies, LLC

(57) ABSTRACT

A vehicle engine mounting arrangement 70 for a transverse mounted engine 54 vehicle is provided. The mounting system 70 includes a vehicle frame 60 for supporting the engine 54 in the vehicle. A U-shaped torsion bar and lever arms combination 76 are connected between the engine 54 and the frame for resisting roll motion of engine 54 with respect to frame 60 in first and second angular directions generally opposite one another. The torsion bar and lever arm combination 76 is tubular with a head 78 of the U-shaped tubular torsion bar and lever arm combination 76 being bracketed 66, 74 to the engine 54.

22 Claims, 5 Drawing Sheets

TRANSVERSE ENGINE MOUNTING ARRANGEMENT

FIELD OF THE PRESENT INVENTION

The present invention relates to mounting arrangements for a transverse mounted engine. The present invention in particular relates to front wheel drive automotive vehicles with transverse mounted engines.

BACKGROUND OF THE INVENTION

In the most recent quarter century there has been an effort to increase fuel economy of automotive vehicles. Several technical trends have developed to achieve increased fuel economy. One such technical trend is front wheel drive. In a front wheel drive vehicle the weight of the engine is placed over the tractive wheels of the vehicle. The increase in traction due to the engine weight on the tractive wheels, provides an increase in fuel economy.

In front-wheel-drive vehicles, it is a typical practice to have the engine and transmission mounts cushion the torque reaction of the differential as well as that of the engine and transmission. As used hereinafter, the terms "mounted" and "mounting" refer to the mounting of the unit of the engine block transmission housing and transaxle. Where the engine and transmission are mounted longitudinally in the vehicle, the torque reaction of the differential is in the pitch direction relative to the vehicle while the torque reaction of both the engine and transmission is in the vehicle roll direction. As a result, the torque reaction of the differential is not difficult to deal with at the cushion mounts for the engine and transmission since the pitch forces on the powertrain may be simply resisted by their vertical spring rates while adequate roll resistance is retained for the engine and transmission. However, in the case where the engine and transmission are mounted transversely in the vehicle, their torque reaction is then in the pitch direction and the torque reaction of the differential which is also in the pitch direction is then directly coupled therewith. This imposes a much greater duty on the cushion mounts supporting the engine and transmission since the pitching forces in addition to the normal engine and transmission torque reaction are then influenced by the product of the axle ratio at the differential and the acting transmission ratio.

Irrespective of the relative position of the engine and transmission in the vehicle, it is desired that the cushion mounts be located adjacent the points of minimum vibratory force in the system, i.e. the node points, to derive maximum benefit in isolating the vibration of the sprung mass including the differential. However, typically there is little space for a conventional cushion mounting arrangement capable of effectively controlling and isolating pronounced powertrain vibrations and particularly the pitching (engine roll) motion thereof where both the engine and transmission are positioned transversely in the vehicle.

Another factor which significantly affects the vibration of a mounted engine in a transverse mounted engine vehicle is shift bobble. Shift bobble is caused by the shift characteristics of a transmission. Shift bobble can cause the engine to have a roll motion vibration or a fore and aft movement in the vehicle chassis. This shift bobble will typically be in the neighborhood of 9 hertz plus-or-minus 2 or 3 hertz. The shift bobble is typically perceived as undesirable, particularly when the engine is mounted in a luxury vehicle. The shift bobble is dependent on both the transmission shift strategy and the engine mounting system vibration dynamics. Shift bobble tends to occur most often in the shift between first and second gears.

Stiff engine mounts (also known as cushion mounts) have been shown to provide excellent shift bobble characteristics, while very soft engine mounts create excessive bobble events. The engine mounts also influence many other vehicle characteristics, so that the choice of the spring and dampening rates of the engine mounts cannot be dictated by shift bobble events alone. The requirements for good shift events appear to be at odds with the requirements for good engine vibration isolation wherein less stiff engine mounts are desired. Fortunately, the above is not the actual case. Good shift bobble characteristics of the engine mounts require that the engine roll rate (stiffness) be high, while the engine bounce rate stiffness (up and down motion) should be low for good vibrational isolation. Current practices of increasing the engine roll rate without affecting the bounce rate is with the addition of a roll restrictor. Roll restrictors are also commonly referred to as torque struts. Torque struts usually attach to the vehicle body adjacent the shock tower or the engine compartment fire wall and therefore add a significant path for engine generated sound to enter the vehicle passenger compartment which is on the opposite side of the fire wall.

It is desirable to provide an engine mounting system for a transverse engine mounted vehicle which minimizes engine roll while having minimal affect or no affect upon the engine bounce rate. It is still another desire of the present invention to provide a mounting arrangement which is resistive of engine roll, is inexpensive and does not require extensive modification of present engine, frame or engine mount designs.

SUMMARY OF THE INVENTION

To make manifest the above-delineated desires, the disclosure of the present invention is brought forth. In a preferred embodiment, the present invention reveals an engine mounting arrangement for a front wheel drive vehicle with a transverse mounted engine. The mounting arrangement includes a vehicle frame which supports the engine and the engine compartment. The engine is supported on engine mounts similar or identical to those known in the art. A U-shaped torsion bar having extending lever arms is bracketed to the top of the engine block. The torsion bar and its integral lever arms are formed from a tubular member. Vertical extensions extend vertically down from the end of the lever arms and are fixedly connected with the supporting frame underneath. The torsion bar acts as an anti-roll bar for the engine and resists roll motion of the engine in both the fore and aft vehicle directions. However, the suspension bounce rate is left unaffected. The torsion bar and lever arm combination of the present invention does not require any connection to the fire wall or shock tower of the vehicle. Accordingly, there is no transfer via a torque strut of engine vibration to the passenger compartment. The torsion bar lever arm combination of the present invention significantly reduces engine roll events due to shift bobble. Accordingly, the driver of the vehicle perceives a higher quality driving experience.

The above-noted features and other advantages of the present invention will become apparent to those skilled in the art from a review of the invention as it is provided in the accompanying drawings and Detailed Description of the Invention.

DETAILED DESCRIPTION OF THE INVENTION

Figure 1A:
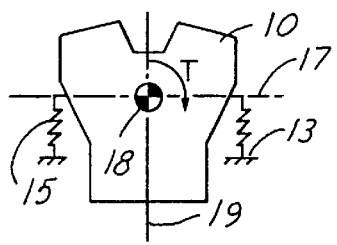
FIGS. 1A and 1B illustrate an engine roll event when the mounts of the engine mounting system are connected to the engine at a height which extends through the powertrain center of mass.
Figure 1B:
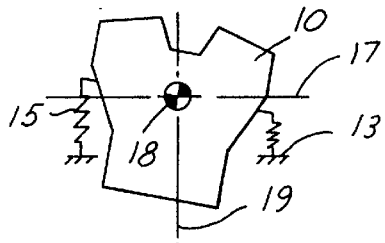

Referring to FIG. 1 an engine block, transmission and transaxle collectively referred to as an engine 10 is supported by the vehicle frame 13. Supporting the engine 10 on the frame 13 are two schematically represented engine mounts 15. The engine mounts in the ideal situation are connected with the engine along a plane 17 which intersects the torsional axis 18 of the powertrain. The torsional axis 18 typically will pass through the center of mass. Due to the reaction force of the powertrain a torsional reaction force T acts upon the engine 10 causing the engine to reciprocatively roll. As shown in FIG. 1B, the engine 10 is rolling toward a passenger compartment not shown. However, in an idealized situation wherein the engine mounts 15 are connected with the engine 10 along the axis 17 which intersects the torsional axis 18, the implied motion of engine 10 will almost totally be a roll motion with virtually no translational action. Accordingly, the torsional axis 18 remains in a vertical plane 19 and although there is a roll vibrational force, the magnitude of the force is typically within desirable limits.

Figure 3A:
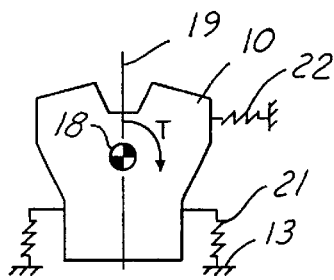
FIGS. 3A, 3B and 3C illustrate a prior art solution where the vehicle engine is supported underneath the torsional roll axis wherein the engine is additionally braced by torque struts extending between the engine and the vehicle fire wall.
Figure 4A:
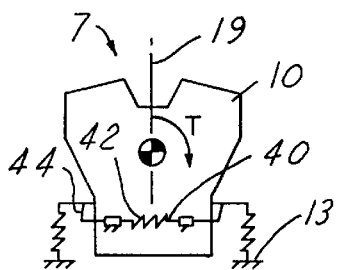
FIGS. 4A and 4B illustrate the principles behind the present invention wherein a torsion bar and lever arm combination is connected between the engine and the engine frame.
Figure 4B:
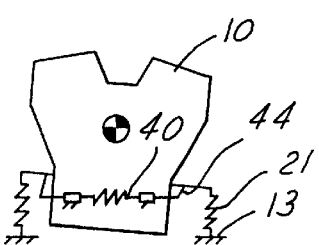

Schematically shown in FIGS. 4A and 4B is the present inventive engine mounting arrangement. Similar items are given like reference numerals as previously given in FIGS. 2A and 3A. The engine mounting arrangement 7 according to the present invention has in addition a torsion bar lever arm combination 40. The torsion bar lever arm combination 40 has a torsion bar portion 42 with a major axis extending generally transverse to the engine 10. The torsion bar portion 42 is connected to either the engine 10 or to the frame 13. The lever arm 44 is connected to the part that the torsion bar is not connected to that being the frame 13 or the engine 10. As shown in FIG. 4B, a roll motion towards the passenger compartment will cause the lever arm 44 on the end of the torsion bar towards the passenger compartment to resist the roll motion by (torsional storage of energy along the torsion bar portion 42 major axis) urging the engine block in a counterclockwise direction and the lever arm on the left resists the roll motion by urging the engine block in the counterclockwise direction. A roll motion towards the front end of the vehicle will in similar manner cause the torsion bar lever arm combination 40 to urge the engine block clockwise. A bounce motion generally along axis 19 will be essentially non-resisted therefore the torsion bar does not make the mounting arrangement of the engine stiff in the bounce direction and therefore maximum vibrational dampening is free to occur.

Figure 2A:
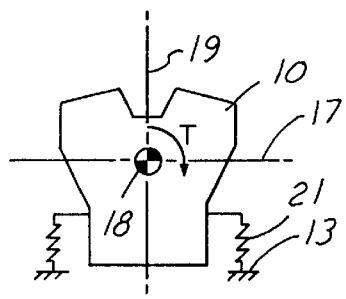
FIGS. 2A and 2B illustrate a torque reaction resulting a roll and fore and aft movement of the engine block when the engine is mounted below the powertrain center of mass.
Figure 2B:
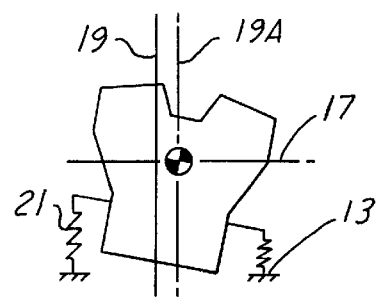
Figure 3B:
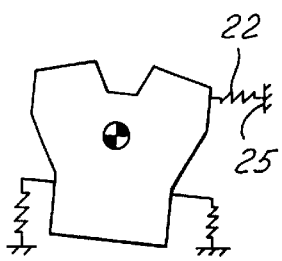
Figure 3C:
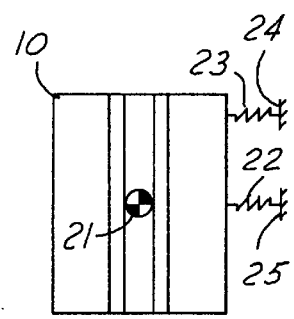

Referring to FIGS. 3A and 3B, like items are given similar reference numerals as shown in. FIG. 2A. An engine 10 has been given a mounting arrangement which additionally includes a pair of torque struts 22 and 23. It is preferable from a cost standpoint to have the torque strut 23 alone. Torque strut 23 connects to the vehicle body in an area typically close to the shock tower 24. The shock tower 24 is a portion of the vehicle body which encloses a shock absorber or MacPherson Serut. The shock tower 24 is typically a strengthened area of the vehicle body. However, if torque strut 23 is the only connection between the engine 10 and the vehicle body the engine will tend to have a rotational movement about its yaw axis 21. Accordingly, there is added another torque strut 22 which extends between the engine 10 and the fire wall 25. Since the torque strut 22 is connected through the center of mass of engine 10, it essentially eliminates a lot of the yaw motion. However, the attachment of strut 22 to the fire wall 25 requires that the fire wall typically be strengthened. An additional problem occurs in that both struts 22 and 23 transfer vibration into the passenger compartment which is on the opposite side of the fire wall 25.

Schematically shown in FIGS. 4A and 4B is the present inventive engine mounting arrangement. Similar items are given like reference numerals as previously given in FIGS. 2A and 3A. The engine mounting arrangement 7 according to the present invention has in addition a torsion bar lever arm combination 40. The torsion bar lever arm combination 40 has a torsion bar portion 42 which is connected to either the engine 10 or to the frame 13. The lever arm 44 is connected to the part that the torsion bar is not connected to that being the frame 13 or the engine 10. As shown in FIG. 4B, a roll motion towards the passenger compartment will cause the lever arm 44 on the end of the torsion bar towards the passenger compartment to resist the roll motion by urging the engine block in a counterclockwise direction and the lever arm on the left resists the roll motion by urging the engine block in the counterclockwise direction. A roll motion towards the front end of the vehicle will in similar manner cause the torsion bar lever arm combination 40 to urge the engine block clockwise. A bounce motion generally along axis 19 will be essentially non-resisted therefore the torsion bar does not make the mounting arrangement of the engine stiff in the bounce direction and therefore maximum vibrational dampening is free to occur.

Figure 5:
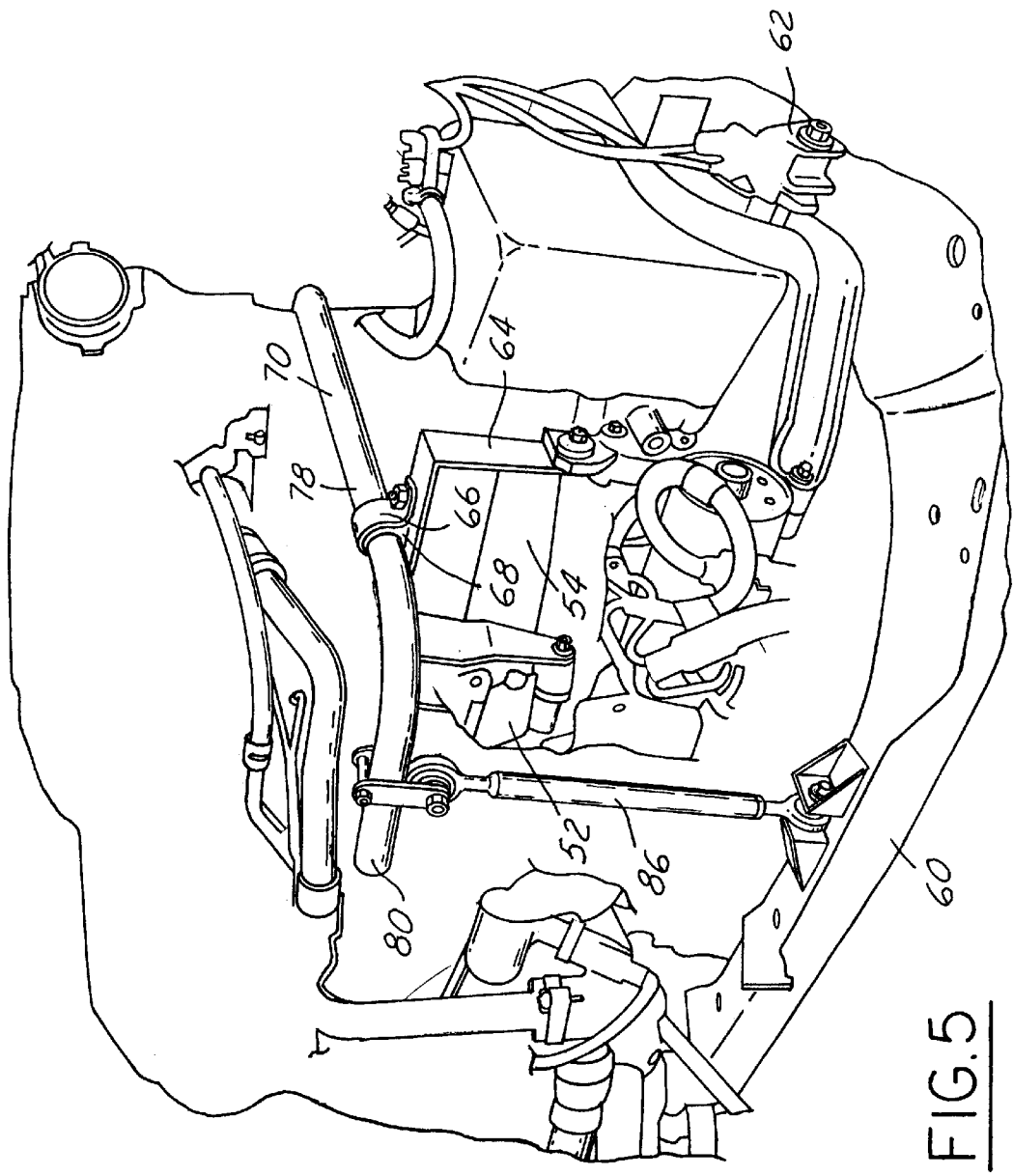
FIG. 5 is a perspective view of a preferred embodiment engine mounting system according to the present invention as viewed from the front of the vehicle with the engine compartment removed for clarity of illustration.
Figure 6:
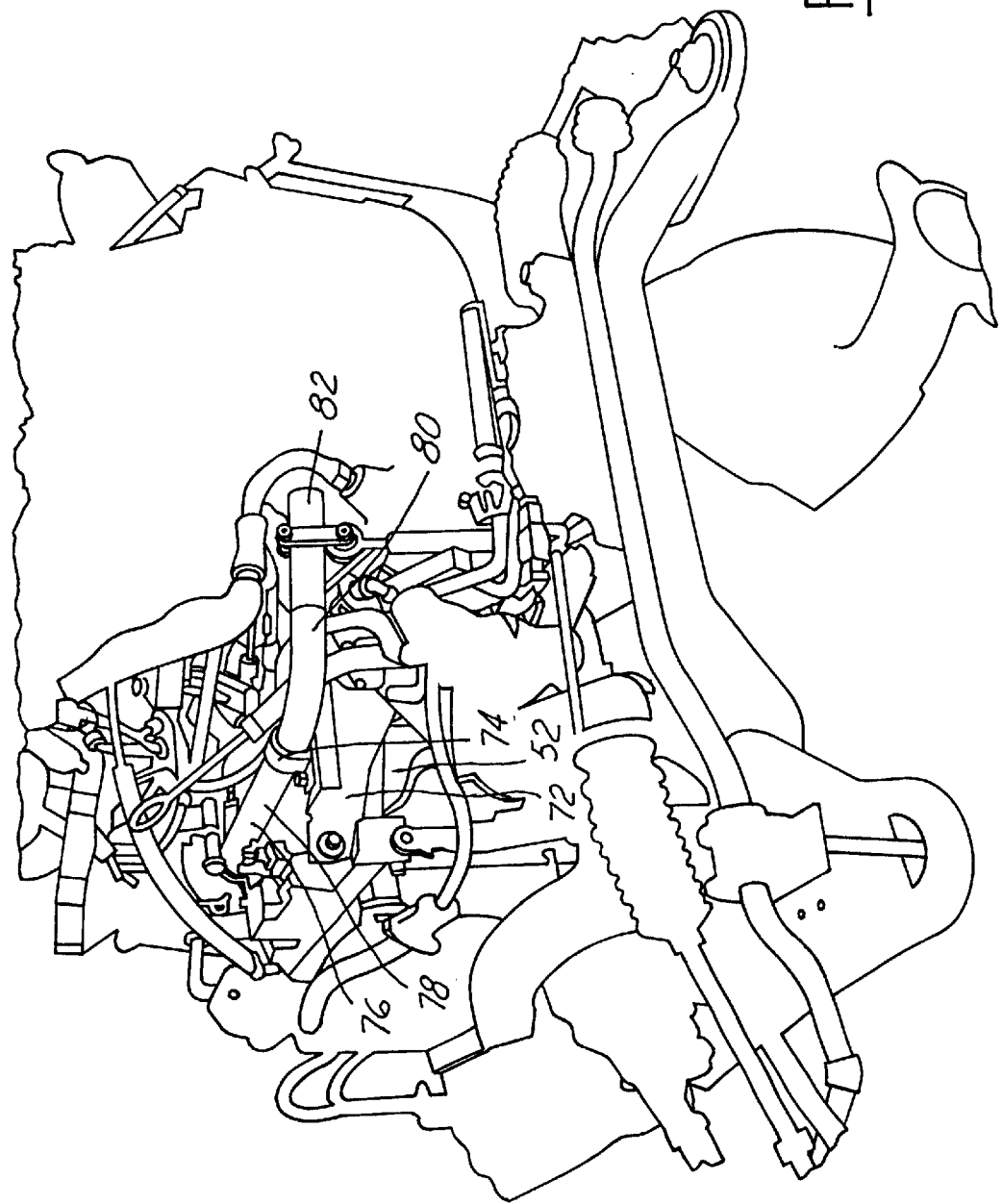
FIG. 6 is a perspective view of a preferred embodiment mounting system of the present invention shown from the rear of the engine compartment with portions of the engine compartment removed for clarity of illustration.
Figure 7:
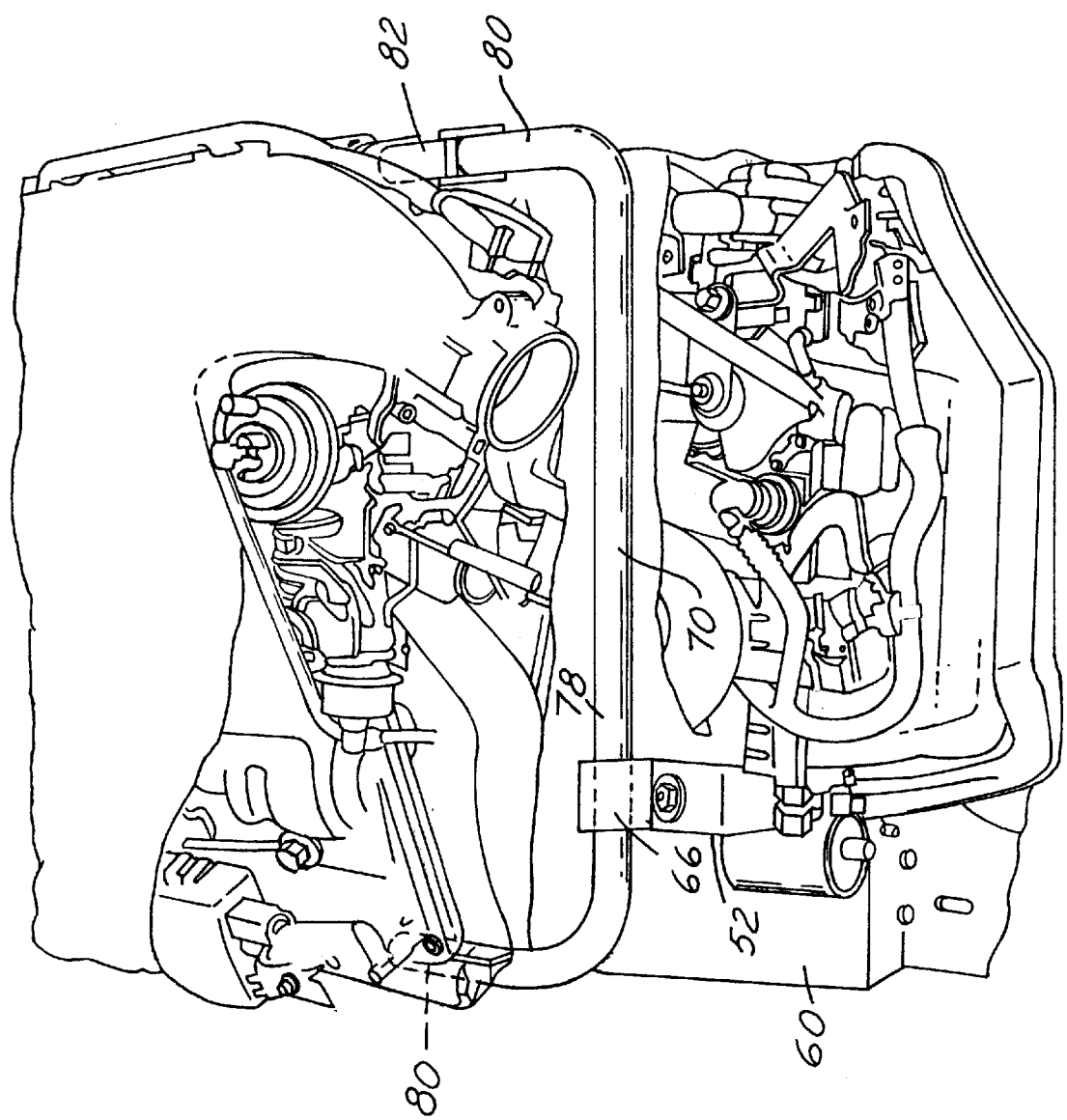
FIG. 7 is a perspective side view similar to that of FIGS. 5 and 6 from the North American driver's side with one of the brackets which connect the torsion arm to the vehicle being removed for clarity of illustration.

Referring to FIGS. 5, 6 and 7 a preferred embodiment engine mounting arrangement 70 according to the present invention is shown in the environment of a transverse mounted front wheel drive vehicle. The vehicle has an engine block 52 which is oriented transverse to the longitudinal axis of the vehicle. The engine block has at its extreme end a transmission casing 54 which is boltably connected thereto. Supporting the engine block 52, transmission casing 54 and transaxle is a generally tubular frame 60. A series of conventional engine mounts 62 strategically located attach the vehicle engine, transmission and transaxle to the frame 60. The engine block 52 and transmission casing 54 have boltably attached thereto a bracket 64. Bracket 64 has boltably connected thereto a torsion bar bracket 66. Torsion bar bracket 66 clamps an elastomeric isolator 68. On the opposite side of the engine block 52 there is connected, as shown in FIG. 6, another bracket 72. The bracket 72 has boltably connected thereto in a similar fashion another bracket 74 which in size, shape and function is essentially identical to bracket 66. Bracket 74 also has an isolator which is not shown for clarity of illustration. Connected to the brackets 66 and 74 is a generally U-shaped torsion bar and lever arm combination 76. Combination 76 includes a head or torsion bar portion 78 which has two integrally connected lever arms 80. The lever arms 80 can be fully integral with the torsion portion 78 or may include extensions 82 which are weldably joined thereon. As shown, the U-shaped torsion member 76 is fabricated from 25 mm diameter tubular steel having a 2–3 mm wall thickness. A typical steel will be spring steel. The lever arms 80 are connected with the frames 60 via vertical extensions 86. The extensions 86 are both connected through brackets 88 boltably or weldably joined to the frame 60.

In operation a roll motion towards the passenger chamber or to the right as shown in FIGS. 5, 6 and 7 will cause the lever arm 80 to be urged to pivot up or counterclockwise as shown in FIG. 6. This force will cause the mounting system 70 to resist the rightward roll motion. Simultaneously, the roll motion of the engine block 52 will cause the lever arm on the front end of the engine as shown in FIG. 5 to be pulled down. The downward pull on the front lever arm 80 also resists the roll movement. A roll movement towards the left or toward the front of the vehicle as shown in FIG. 7 will cause the exact opposite reaction by the lever arm. Accordingly the mounting system 70 resists engine roll in the two opposite angular directions.

Figure 8:
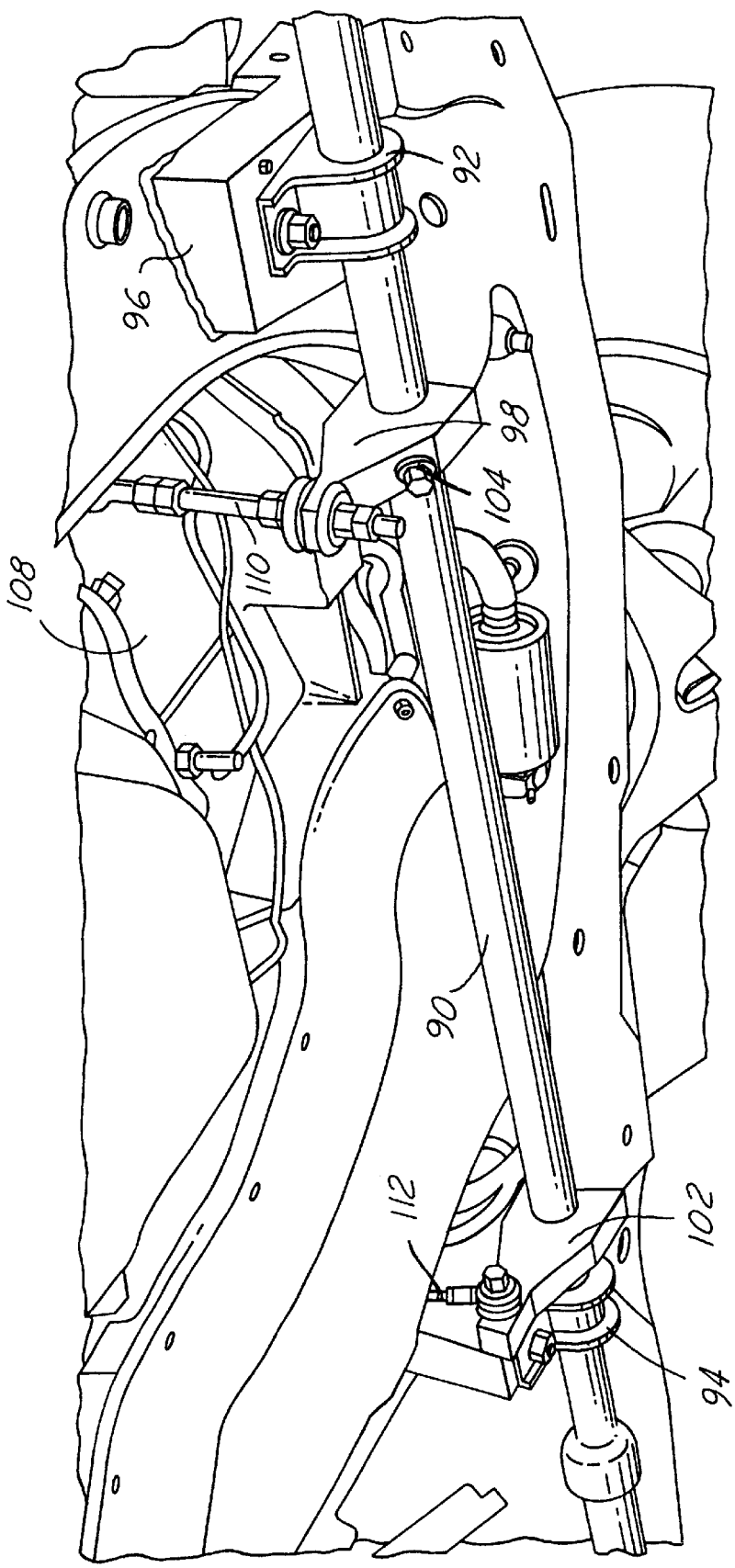
FIG. 8 is an alternate preferred embodiment of the present invention having a torsion arm connected to the bottom of the frame with lever arms positionally adjustable thereon.

Referring to FIG. 8, an alternate preferred embodiment of the present invention is shown which has a cylindrical member, torsion bar 70. The torsion bar 70 is mounted by brackets 92 and 94. The brackets 92 and 94 are boltably connected underneath the frame 96. The torsion bar 90 has two lever arms attached thereto, 98 and 102. Bracket arm 98 by virtue of a bolt 104 is positionally adjustable upon the torsion arm 90. Accordingly, the torsion bar 90 can be standardized for different size vehicles and the bracket arm 98 can be moved laterally to accommodate different vehicle size dimensions. The bracket arm 106 is connected with the vehicle engine via a rod linkage 110. In a similar manner, the bracket arm 102 is connected with a rod linkage 112. The bracket arms 98, 102 differ in their attachment of their respective rods 110, 112 due to space considerations.

In operation, engine roll in the embodiment of FIG. 8 is resisted in the same manner as previously described for the torsion bar and lever arm combination 70. The torsion bar 90 and its associated components finds its greatest utilization on larger vehicles which already have a large amount of ground clearance. The torsion bar suspension arrangement as described in FIGS. 5, 6 and 7 is more suitable for most passenger-type vehicles.

Both embodiments of the present invention can also be used in transverse mounted mid-engine or rear engine vehicles.

While preferred embodiments of the present invention have been described, those skilled in the art will recognize that other and further modifications may be made without departing from the present invention as it is defined and encompassed by the specification, drawing and accompanying claims.

What is claimed is:

1. A vehicle engine mounting arrangement for a vehicle having a transverse mounted engine comprising:
   a vehicle frame for supporting said engine in said vehicle; and
   a U-shaped torsion bar and lever arms combination connected between said engine and said frame for resisting roll motion of said engine with respect to said frame in first and second angular directions, said torsion bar and lever arm combination being tubular with a head of said U-shaped tubular torsion bar and lever arm combination being bracketed to said engine.

2. A vehicle engine mounting arrangement as described in claim 1, having multiple bracket members bracketing said torsion bar and lever arm combination to said engine.

3. A vehicle engine mounting arrangement as described in claim 1, wherein said lever arms have an end connected with a vertical extension for connection to said frame underneath.

4. A vehicle having a transverse mounted engine comprising:
   a vehicle frame for supporting said engine in said vehicle; and
   a U-shaped torsion bar and lever arms combination connected between said engine and said frame for resisting roll motion of said engine with respect to said frame in first and second angular directions, said torsion bar and lever arm combination being tubular with a head of said U-shaped tubular torsion bar and lever arm combination being bracketed to said engine.

5. An engine mounting arrangement for a vehicle having a transverse mounted engine comprising:
   a vehicle frame for supporting said engine in said vehicle;
   a torsion bar and lever combination with said torsion bar having a major axis generally extending transverse of said engine, and said torsion bar and lever combination having two lever arms connected between said engine and said frame for resisting roll motion of said engine with respect to said frame along two angular directions generally opposed to one another by torsional storage of energy in said torsion bar along said torsion bar major axis.

6. A vehicle engine mounting arrangement as described in claim 5, wherein said torsion bar is bracketed to said frame.

7. A vehicle engine mounting arrangement as described in claim 5, wherein said torsion bar is bracketed underneath said frame.

8. A vehicle engine mounting arrangement as described in claim 5, wherein at least one of said lever arm is positionally adjustably connected upon said torsion bar.

9. A vehicle engine mounting arrangement as described in claim 5, wherein said torsion bar is bracketed to said engine.

10. A vehicle engine mounting arrangement as described in claim 5, wherein said torsion bar and said lever arms are integrally formed.

11. A vehicle engine mounting arrangement as described in claim 5, wherein said torsion bar and lever arms combination is formed as a generally U-shaped member.

12. A vehicle engine mounting arrangement as described in claim 11, wherein said U-shaped member is tubular.

13. An automotive vehicle having a transverse mounted engine comprising:
   a vehicle frame for supporting said engine in said vehicle;
   a torsion bar and lever combination with said torsion bar having a major axis generally extending transverse of said engine, and said torsion bar and lever combination having two lever arms connected between said engine and said frame for resisting roll motion of said engine with respect to said frame along two angular directions generally opposed to one another by torsional storage of energy in said torsion bar along said torsion bar major axis.

14. A vehicle as described in claim 13, wherein said torsion bar is bracketed to said frame.

15. An automotive vehicle as described in claim 13, wherein said vehicle is a front wheel drive vehicle.

16. A vehicle as described in claim 13, wherein said torsion bar is bracketed underneath said frame.

17. An automotive vehicle as described in claim 13, wherein said torsion bar and lever arms combination is an integral U-shaped member.

18. An automotive vehicle as described in claim 17, wherein said torsion bar of said torsion bar and lever arms combination is a head of said U-shaped member and said head is connected to said engine by brackets.

19. An automotive vehicle as described in claim 18, wherein said U-shaped member head is connected to an upper end of said engine and said lever arms are connected by vertical extensions to said frame.

20. An automotive vehicle as described in claim 19, wherein said U-shaped member is tubular.

21. A vehicle as described in claim 13, wherein at least one of said lever arms is positionally adjustably connected upon said torsion bar.

22. A vehicle as described in claim 13, wherein said torsion bar is bracketed to said engine.

\* \* \* \* \*